Sept. 16, 1969

K. UTZ 3,467,565

METHOD OF LAMINATING A CARRIER WEB AND
A HIGH MELTING PLASTIC FILM

Filed Aug. 22, 1967

Inventor
Kastulus Utz
By Richard Low
Agt

United States Patent Office 3,467,565
Patented Sept. 16, 1969

3,467,565
METHOD OF LAMINATING A CARRIER WEB
AND A HIGH MELTING PLASTIC FILM
Kastulus Utz, Freising, Upper Bavaria, Germany, assignor to Multifol Patentverwertungs A.G., Chur, Switzerland, a corporation of Switzerland
Continuation-in-part of applications Ser. No. 211,238, July 20, 1962, and Ser. No. 427,293, Jan. 22, 1965. This application Aug. 22, 1967, Ser. No. 662,328
Claims priority, application Germany, July 27, 1961, A 37,992; Jan. 24, 1964, A 45,081
The portion of the term of the patent subsequent to May 15, 1982, has been disclaimed
Int. Cl. B32b 31/08
U.S. Cl. 156—244          7 Claims

ABSTRACT OF THE DISCLOSURE

At least two film formations of different thermoplastic materials are simultaneously extruded, one of the extruded films being of a high melting and the other film being of a low melting plastic. The two films are superposed and bonded and the freshly obtained laminated step product and a carrier web are likewise superposed and bonded, with the free surface of the low melting film contacting the carrier web. According to a modified and preferred mode of operation, the low melting film is sandwiched between the high melting film and the carrier web and the three layers are bonded together at the same time. The bonding in the latter case is done by subjecting the three-ply structure to pressure and heat to yield a composite laminate.

BACKGROUND OF THE INVENTION

This application is a continuation-in-part of my copending applications Ser. No. 211,238, filed July 20, 1962, now abandoned; and Ser. No. 427,293, filed Jan. 22, 1965, now Patent No. 3,339,234, dated Sept. 5, 1967.

The present invention relates to a method of laminating a carrier web and a high melting plastic film.

It has been known for some time to widen the range of use of plastic films by laminating the films, for instance, to paper, boards, fabric, tissue, aluminum foil. Different techniques are employed for making such laminations. For instance, aqueous adhesives, solvent cements, and thermoplastic base adhesives are used for bonding purposes. It is also known to extrude a film on supporting sheet material, such as a web of paper.

One known laminating technique provides applying an adhesive to one of, say, two webs in molten condition and joining the webs while the adhesive is still molten. This method is one of the simplest lamination techniques since no solvent is to evaporate and thus no drying is needed. One object of my present invention is to provide a method of this general type.

However, great difficulties were always encountered whenever a high melting plastic film was to be joined with some carrier. By a "high melting" plastic plastics are meant such as nylon, some polyesters, and polyacetaldehyde. A high melting polyester is marketed by the German company Bayer, Leverkusen, under the trademark "Makrolon," and E. I. du Pont de Nemours & Co. is marketing a polyacetaldehyde under the trademark "Delrin." Such high melting plastics generally melt at temperatures above 200° C. The primary object of this invention is to overcome the difficulties in using plastics of the referred to high melting kind as components in laminations.

An important object of the invention centers about a method of laminating carrier sheet material and high melting plastic films, which renders such laminations easy, economical, and reliable.

Another important object of the present invention is to improve the strength of the bond between the several laminae of the finished laminate.

The foregoing objects and such other objects as will appear from the following description, and the advantages associated therewith, may be accomplished, as has already been indicated, by permanently joining a carrier web and a plastic web, the latter being constituted by a laminated step product composed of at least two plastic laminae. One of the two laminae is a film of a high melting material of the aforementioned kind while the other lamina is a film of a low melting material. The laminated step product has two faces, one of the faces being a surface of the high melting plastic film, and the other face being a surface of the low melting plastic film. The carrier web and plastic web are united by joining the two webs across the surface of the low melting film, and subjecting the two webs to heat and pressure. The pressure is then released, and the finished laminate is cooled.

SUMMARY OF THE INVENTION

According to one aspect of the invention, the plastic web or laminated step product referred to hereinbefore is produced according to the method described and shown in a patent of mine, No. 3,184,358, dated May 18, 1965, and entitled "Method of Forming Laminated Plastic Tubing." In accordance with the method of said patent, at least two tubular formations of different thermoplastic materials are coaxially and spacedly extruded. The materials are difficulty susceptible to bonding. One of the tubular formations constitutes an outer tube which encloses the other tubular formation constituting an inner tube. A fluid pressure medium is admitted into the interior of the inner tube to expand the latter against the outer tube. Portions of opposing faces of the two tubes define a closed space into which a gas is introduced or in which a gas is developed, that is capable of reacting with at least one of the plastic materials used in order to make possible or to enhance the bonding of the two plastic materials. As the tubes are continuously extruded, they bond together beyond the referred to space.

The composite tube thus obtained is worked on further in its freshly extruded condition, while hot. It is flattened and longitudinally cut open to yield two plastic webs, each of said webs consisting of a high and a low melting film. A carrier web and one of the plastic webs are then passed through nip rolls at a temperature above the melting temperature of the low melting film material. The low melting plastic film acts as an adhesive, while hot, and makes it easily possible to unite, for instance, a web of kraft paper, and a high melting plastic film without affecting the high melting film in any way. At the same time, upon cooling of the thus obtained laminate, the solidified low melting plastic may, due to its inherent properties, help meet desired performance requirements.

Rather than bonding a high and a low melting plastic film to each other first and bonding the step product thus obtained to a carrier web afterwards, with the free face of the low melting film contacting the carrier web, the two bonding steps may advantageously be carried out simultaneously.

According to another aspect of this invention, a plastic web or laminated step product consisting of a high melting and a low melting plastic film is produced with the aid of apparatus disclosed in the aforementioned copending application Ser. No. 427,293 of mine, whereupon the freshly produced plastic web and a carrier web are superposed, having thereby the free surface of the low melting film contact the carrier web. This three-ply structure is subjected to pressure and heat.

DESCRIPTION OF PREFERRED EMBODIMENTS

Figure 1A:
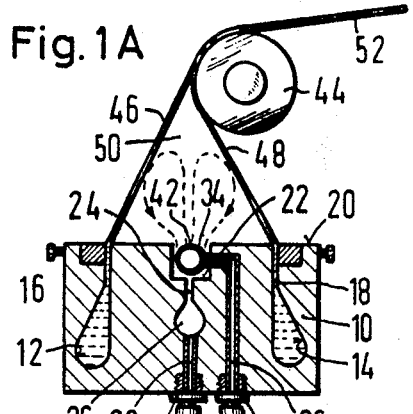
FIG. 1A schematically illustrates die means and associated means for producing a laminated step product composed of two plastic laminae.

Referring to the drawing in greater detail now, and initially to FIG. 1A, an extrusion die 10 consists of an elongated body of rectangular prismatic shape. Two parallel longitudinal bores 12, 14 in the die 10, which do not extend over the entire length of the die, are connected with screw presses (not shown) to supply a different thermoplastic material in a fluid condition to each of the bores 12 and 14. An elongated slot 16 and 18, respectively, leads from the bores 12, 14 to the front face 20 of the die 10. The slots 16, 18 are coextensive with the bores 12, 14 and extend in a spaced parallel relationship.

A groove 22 in the front face 20 is parallel and equidistant from the slots 16, 18 and extends over the entire length of the die. It is of rectangular cross section and is connected by a slot 24 in its bottom face with a gas exhaust duct 26. The slot 24 and duct 26 are longitudinally closed, but extend almost over the entire length of the die. A transverse bore 28 connects the duct 26 to a nipple 30 from which a flexible tube 32 leads to an exhaust blower not shown.

A longitudinally extending cylindrical gas distributor pipe 34 is coextensive with the groove 22 and is mounted therein with clearance from all walls of the groove. The pipe 34 is supported on feed pipes 36 which pass through corresponding openings in the die 10. The pipes 36 communicate with nipples 38 and flexible tubes 40 which connect the nipples to a gas source such as a storage tank G. Frontal orifices 42 are uniformly distributed over the length of the pipe 34.

A driven take-off roll 44 is mounted so that the longitudinal plane of symmetry of the die is approximately tangential to the roll.

Extruded sheets 46, 48 move in planes which are obliquely inclined relative to each other and meet each other in the surface of the roll 44. The sheets are trained over the roll 44 in superposed relationship. The portions of the sheets between the front face 20 and the roll 44 and the central portion of the front face 20 define an elongated space 50 of approximately triangular cross section. The space 50 is longitudinally open to the atmosphere.

An activating gas is fed to the space 50 from the aforementioned tank G through the gas distributor pipe 34 at a rate sufficient to permit reaction of the gas with at least one of the sheets 46, 48 to activate same for subsequent bonding of one of the opposing faces of the sheets 46, 48 to the other opposing face when the two sheets travel under pressure over the roll 44. The laminated step product or plastic web is designated 52.

Instead of the single take-off roll 44 shown in FIG. 1A two rolls are preferably used between which the two sheets 46, 48 may be bonded under higher pressure.

Figure 1B:
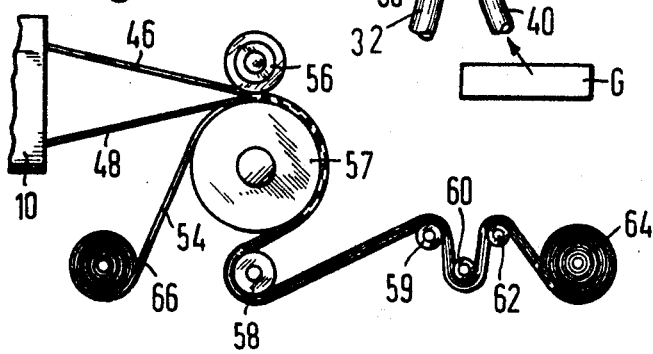
FIG. 1B shows apparatus associated with the die means of FIG. 1, used for bonding the plastic laminae produced with the aid of the die means of FIG. 1A to each other and to a carrier web.

The plastic web 52 may then immediately be bonded to a carrier web, using thereby the heat retained by the plastic web, when still above the melting temperature of the low melting film material, and such pressure as will ensure a strong bond. FIG. 1B shows how the two plastic sheets 46, 48 produced by the die of FIG. 1A, rather than the plastic web 52, may be combined with a carrier web 54. The sheet or layer 48 consists of low melting material whereas the sheet or layer 46 consists of high melting material. The outer face of the layer 48 is bonded to the carrier web 54 when both sheets 46, 48 and the carrier web 54 are passed between two take-off rolls 56, 57 while the temperature of the sheets 46, 48 is still sufficiently high, that is, above the melting temperature of the low melting film material, to make the low melting film 48 bond to the carrier web 54. The finished laminate is composed of three layers 46, 48, 54 and is passed over guide and cooling rolls 58, 59, 60, and 62 to a winding roll 64. The carrier web 54 is supplied from a supply roll 66. For further information on the apparatus here used reference is made to the aforementioned application Ser. No. 427,293.

In FIG. 1A, equipment is shown in which the plastic films or sheets 46 and 48 are first bonded to each other by the take-off roll 44 to yield the plastic web or laminated step product 52 which may then be bonded to a carrier web by means of take-off rolls as shown in FIG. 1B. While the temperature of the sheets 46, 48 is kept sufficiently high to make the bonding of the sheet 48 to a carrier web possible, provided the two steps follow each other closely in time and space, I prefer to do away with a take-off roll of the type shown in FIG. 1A and to arrange instead for simultaneously bonding the two plastic laminae to each other and the low melting film 48 to the carrier web 54. For this purpose, all that is to be done is simultaneously and individually training the three sheets preferably between two take-off rolls. While a single take-off roll does not necessarily produce enough pressure to ensure a good bond, two take-off rolls can easily be adjusted to safely provide the required pressure. Equipment for simultaneous bonding is shown in FIG. 1B.

Figure 2:
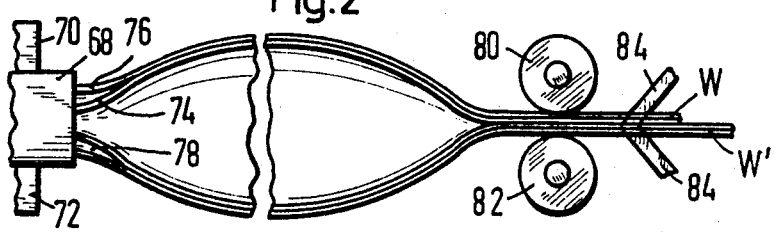
FIG. 2 schematically and fragmentarily illustrates a modified apparatus for producing a laminated step product composed of two plastic laminae.

Having reference to FIG. 2, there is shown a die 68 which is associated with two extruders 70, 72. Two tubings 74 and 76 of different thermoplastic materials are extruded from the die 68. The material of the inner tubing 74 is high melting and the material of the outer tubing 76 is low melting. The inner tube 74 is inflated by means not shown against the outer tube 76, which results in the formation of a closed annular space 78 and in the contacting of the two tubings beyond the space 78, when viewed in the extrusion direction. Gas which is capable of reacting with at least one of the two plastics is introduced in the space 78. The tubes are continuously extruded to enter between two tube-flattening rollers 80 and 82 and to be bonded. The flattened composite tube is cut open along both edges by cutting means 84, 84, yielding two plastic webs W and W′ of which each consists of a low and a high melting film. Each of the webs is then dealt with in the manner described with reference to the web 52. For further information on the forming of laminated plastic tubing see the referred to Patent 3,184,358.

However, it is also possible (see FIG. 3) when an outer tube 76′ is low melting to lead two carrier webs 86, 88 toward and between two rollers 80′, 82′, whereby each of the carrier webs contacts a low melting film 76′. In this way a six-ply web is formed, having a carrier web 86 and 88, respectively, on the outside, a low melting film next thereto, and a high melting film 74′ next to the low melting film, side-by-side. Knives 84′, 84′ slit the six-ply structure, which yields two three-ply laminates, with each three-ply laminate consisting of a carrier web on one side and a high melting film on the other side, and a low melting film between the carrier web and high melting film.

The mode of operation of the apparatus of FIG. 1A is further illustrated by the following example, but it

5 will be understood that the invention is not limited thereto:

Example 1

Nylon (type 66) was fed to one of two screw presses used and was discharged in sheet form from the extrusion slot 16 (FIG. 1A). Simultaneously, polyethylene having a melt index of about 1.5 was extruded through the slot 18 by the other screw press. Practically pure oxygen was fed through the flexible tube 40 and the distributor pipe 34 to the space 50. The oxygen stream was controlled in such a manner that there was outward flow of gas from the longitudinal ends of the space 50 while gas was simultaneously exhausted from the chamber or space 50 through the flexible tube 32.

The die body 10 was held at a temperature of 240° to 260° C. by electric heaters, not illustrated in the drawing. The two extruded plastic sheets had approximately the same temperature at the slots 16, 18 whose length was 300 millimeters. The rate of extrusion from either slot was approximately 400 grams per minute. The thickness of both extruded sheets was approximately 100 microns. Adjustment of the extrusion slot width and variations in the rotary speed of the screw presses permitted the extrusion rate to be varied between 100 and 500 grams per minute with sheet thickness between about 20 and 300 microns.

It was determined experimentally that the bond between the layers of nylon and polyethylene formed on the roll 44 was greatest under the indicated conditions of operation when the stream of oxygen supplied to the space 50 was 1500 cubic centimeters per minute as measured at ambient temperature and pressure. Variations on other process variables require adjustment of the oxygen feed rate by trial and error for best results. The pressure to which the two layers were subjected on the role 44 was 10 kg./cm.

Tests of the laminate first obtained showed that bond strength was better in the central portion than nearer the edges. A product of more uniform high bond strength was obtained under otherwise identical conditions when the orifices 42 in the gas distribution pipe 34 near the longitudinal ends of the pipe were somewhat enlarged in a manner not capable of distinct pictorial representation in FIG. 1A, whereby oxygen discharge near the open ends of the space 50 was increased. The force required for separating the two layers of a strip of laminate 10 mm. wide was 50 to 80 grams over the entire width of the improved product.

It is believed that the elementary oxygen fed to the space 50 produces ether linkages between carbon atoms in the chains of the polyethylene and of the polyamide. The assumption of a chemical reaction between the activating gas and the plastics is supported by the observation that the bond strength between the two layers of the laminate deteriorates in continuous operation unless the gas contents of the space 50 are changed more rapidly by exhausting through the groove 22 than would be possible by mere venting through the open ends of the chamber. It is apparently necessary to purge the space 50 of the reaction products. The dipole moment of the polyethylene is increased by the reaction.

Example 2

In accordance with FIG. 1B, a web 54 of soda kraft paper of a weight of 90 grams per sq. m. was unwound from a rotatably mounted roll 66 and was given a desired path over a preheating cylinder (not shown) and over guide rollers (not shown) toward the take-off rolls 56, 57. The two sheets 46 and 48, too, were passed toward these take-off rolls, whereby the low melting sheet 48 contacted the kraft paper. The pressure applied to the sheets 46, 48, and 54 between the rolls 56, 57 and was 10 kg./cm.

Example 3

The procedure of Example 1 was repeated, but oxygen was replaced by technically pure chlorine as the activating gas under otherwise identical conditions. Hydrogen chloride was found in the gas discharged from the space 50, and there is evidence indicating that chlorine entered the polymer molecules by substitution. It is believed that carbon-to-carbon bonds between the nylon and polyethylene chains were established in the activated bond.

The bond strength was greater than the strength of the polyethylene layer.

When the high melting polyamide layer in the above examples is replaced, for instance, by polyvinyl chloride, polystyrene, or polyurethane to be bonded to a polyethylene layer by being simultaneously extruded under the conditions of the examples a corresponding increase in bond strength is observed.

Example 4

A two-layered plastic tube was produced according to Example 2 of the repeatedly referred to Patent No. 3,184,458. The tubing consisted of a 20µ polycaprolactam nylon film and a 40µ polyethylene film. The polyethylene film had a melt index of approximately 1.5 and a specific gravity of 0.92. The tube was processed as is shown in FIG. 2. Each of the plastic webs W and W' (see FIG. 2) was then immediately bonded to a carrier web.

Figure 3:
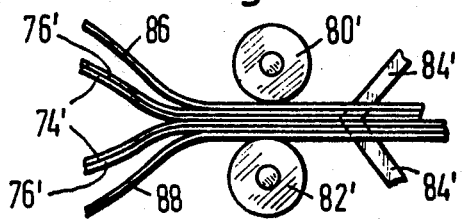
FIG. 3 schematically and fragmentarily illustrates a modified apparatus for simultaneously laminating two plastic laminae to each other and to a carrier web.

As a modification, the two-layered tube of Example 4 was also processed according to FIG. 3, using the flattening rollers 80', 82' to bond the two layers of the composite tube, now designated 74', 76', and two carrier webs 66 and 88 immediately together. The bonding pressure applied here was 10 kg./cm.

It is believed that the method of my invention and the advantages thereof will be fully understood from the foregoing detailed description. The present method makes it very easy and simple to laminate a high melting film to a carrier by hot-melting, which has not been possible heretofore. My method provides making a step product which includes a low and a high melting plastic film, and immediately bonding the low melting film of the step product to a carrier. The bonding of the low melting film to the carrier is done at the temperature retained in the step product, which is above the melting temperature of the low melting film and below the temperature of the high melting film. The plastic films may be produced in tubular or sheet form. Tubes are cut open to yield sheets.

However, it is preferred to do the bonding of all the layers in a single step. In either case it is possible to pass the laminae before they are bonded over preheating cylinders if this is necessary or advisable.

While the embodiments shown and described constitute three-ply structures only, it will be apreciated that the present inevntion is readily applicable to laminates consisting of more than three layers. It is only necessary that a low melting film be used as an adhesive next to the carrier, regardless of the arrangement and number of other plastic laminae. It will also be understood that the carrier material to be used for the purposes of the invention may be of any kind, for instance, of a two-layer structure. The carrier layers may be next to each other or separated by a plastic lamina.

The present invention starts with difficulty bonding plastic films and uses a low melting film to bond a high melting film to a carrier, taking advantage of the lower melting temperature of the low melting film and of a pressure high enough to obtain the strongest possible bond.

It will be apparent that while I have shown and described my invention in a few forms only, many changes and modifications may be made without departing from the spirit of the invention defined in the appended claims.

I claim:

1. A method of laminating a carrier web and a high melting plastic film, comprising (1) simultaneously and spacedly issuing from die means having at least two orifices, in condition of plasticity, at least two film formations of different thermoplastic materials, one of said materials yielding said high melting plastic film, the other material yielding a low melting plastic film, (2) continuously moving said film formations away from said die means, (3) superposing said film formations in a bonding zone spaced from said die means in the direction of movement of said film formations.

(a) the moving film formations and side die means defining a space therebetween, (b) each of said moving film formations having a face bounding said space, (4) continuously providing a gas within said space, capable of reacting with at least one of said film formations, and helping said film formations to bond together in said bonding zone, (a) the composite film thus obtained having as one of its surfaces a surface of said low melting film, (5) superposing said composite film and said carrier web, having thereby the free surface of said low melting film contact said carrier web, (6) subjecting the superposed composite film and carrier web to pressure and heat, thereby bonding said low melting film to said carrier web, and (7) releasing said pressure.

2. In the method according to claim 1, guiding said carrier web to said bonding zone, having thereby the free surface of said low melting film contact said carrier web, subjecting said film formations and said carrier web to pressure and heat, and simultaneously bonding said film formations and said carrier web together.

3. In the method according to claim 1, issuing at least two tubes as said film formations, one of said tubes enclosing the other tube, said one or outer tube having an inner face, said other or inner tube having an outer face, continuously admitting a fluid pressure medium into the interior of said inner tube, and thus expanding same against said outer tube, portions of said inner face and said outer face defining said space, said space being closed, said composite film being constituted by a composite tube, flattening said composite tube, longitudinally cutting said composite tube open to form two laminates, each of said laminates consisting of a low and a high melting film and having as one of its surfaces a surface of the low melting film, and superposing one of said laminates and said carrier web, having thereby the free surface of said low melting film contact said carrier web.

4. In the method according to claim 1, issuing at least two tubes as said film formations, one of said tubes enclosing the other tube, said one or outer tube having an inner face, said other or inner tube having an outer face, continuously admitting a fluid pressure medium into the interior of said inner tube and thus expanding same against said outer tube, portions of said inner face and said outer face defining said space, said space being closed, said composite film being constituted by a composite tube, said composite tube consisting of a low and a high melting film, superposing said composite tube and two carrier webs, having thereby a low melting film contact one of said carrier webs, and thus forming a six-ply structure, flattening said structure and longitudinally cutting said structure to form two three-ply laminates.

5. The method according to claim 1 wherein said gas is introduced into said space in a continuous stream and continuously withdrawn from said space.

6. In the method according to claim 1 said high melting plastic film being polyamide and said low melting plastic film being polyethylene.

7. In the method according to claim 1 the material of said high melting plastic film being selected from a group consisting of polyvinyl chloride, polystyrene, and polyurethane, said low melting plastic film being polyethylene.

References Cited

UNITED STATES PATENTS

| | | | |
|---|---|---|---|
| 2,917,217 | 12/1959 | Sisson | 156—244 X |
| 3,068,516 | 12/1962 | Hofer | 264—95 |
| 3,184,358 | 5/1965 | Utz | 156—244 |
| 3,187,982 | 6/1965 | Underwood et al. | 156—244 X |
| 3,265,552 | 8/1966 | Berggren et al. | 156—244 |

HAROLD ANSHER, Primary Examiner

T. R. SAVOIE, Assistant Examiner

U.S. Cl. X.R.

156—259, 497; 264—83, 99